United States Patent [19]
Reimel

[11] Patent Number: 5,008,630
[45] Date of Patent: Apr. 16, 1991

[54] STATIONARY PROBABILITY INTEGRATOR SYSTEM

[75] Inventor: Paul F. Reimel, Quakertown, Pa.

[73] Assignee: The United States of America as represented by the Secretary of the Navy, Washington, D.C.

[21] Appl. No.: 811,695

[22] Filed: Mar. 26, 1969

[51] Int. Cl.$^5$ .................... H03K 5/00; G01R 23/16
[52] U.S. Cl. ............................ 328/165; 324/77 B; 367/125; 367/126
[58] Field of Search ............... 324/77, 77 B; 328/165; 367/125, 126

[56] References Cited
U.S. PATENT DOCUMENTS
3,337,799 8/1967 Peterson .................... 324/77

Primary Examiner—Nelson Moskowitz
Attorney, Agent, or Firm—James V. Tura; James B. Bechtel; Susan E. Verona

[57] ABSTRACT

A stationary probability integrator system for facilitating spectral analysis of detected signals by suppressing random frequency background noise, such as ocean disturbances and marine life, and by enhancing spectral signatures of discrete sound sources, such as generated by submarines in water. A raw 0 to 100 Hertz frequency spectrum of noise and spectral signature from a frequency analyzer having 500 increments or elements is divided into ten assemblies of 50 elements per ensemble. The ensemble averages, which are the average simultaneous energy levels of all elements in respective ensembles, of each sample is negatively combined with the energy level of each element of the corresponding ensemble of the next consecutive raw sample. Each combination and the cumulative algebric sum of each combination is then displayed in the same frequency spectrum as the samples. The cumulative energy levels of background noise elements will be substantially zero, while the cumulative energy levels of spectral signature elements will build up in a positive direction to an extent limited only by the display's capability. Thus, pronounced spectral signatures of discrete underwater sound sources is presented.

7 Claims, 3 Drawing Sheets

STATIONARY PROBABILITY INTEGRATOR SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a signal processing system for suppressing background noise from signals containing discrete information, and more particularly to a stationary probability integrator system for processing underwater sounds having components of noise and spectral signatures to obtain maximum detection of submarines and other man-made sound sources.

LOFAR, which is an acronym for Low Frequency Analyzing And Recording, is one of several well-known ASW (anti-submarine warfare) techniques used to detect the spectral signatures of submarine-generated sounds which travel long distances in water. The complex waveforms of sound periodically sampled by a hydrophone suspended in the water are electrically transmitted to a spectrum analyzer which measures the amplitudes of the frequency components of each complex waveform throughout the frequency range of the waveform and produces an analog output of a series of voltage pulses, the amplitude of each pulse being indicative of the energy level in each frequency component. In practice, the voltage in each pulse represents the energy level for a range of frequency components called increments or "elements", and the frequency range per increment determines the resolution of each analysis. For a given resolution, the duration of each pulse and the frequency range of each entire spectrum analysis determines the sampling rate of the sound. The analyzer output may be displayed on a chart or cathode ray tube as an "A" or "B" trace. An "A" trace has horizontal and vertical coordinates of frequency and energy level, respectively, and displays a single spectrum analysis in real time. A "B" trace, or lofargram, has horizontal and vertical coordinates of frequency and time, respectively, with line intensity a function of energy level.

Due to the very low signal-to-noise ratios often present in the detected sound, particularly of submarine signatures in the presence of marine life or high sea-state conditions, it is desirable to enhance the spectral signatures of submarines above the background noise. An automatic line integrator (ALI) has been developed for this purpose. Its operation is premised on there being, over a discrete period, relatively high cumulative energy levels of all frequency elements in the spectral signature as compared to the remaining frequency elements associated with background noise. That is, the energy pattern of the spectral signature is not random, while it is random for the noise. Briefly, the ALI biases the analog output of the spectrum analyzer to a reference level equal to the spectrum average, which is the average energy level of all the frequency elements in the analysis, and results in bipolar analog signals. The energy levels of the same frequency elements in a series of such bipolar analog signals are then algebraically summed over a discrete time period for a series of consecutive samples, and the cumulative energy level of each element is displayed. If it is assumed that the energy levels of corresponding noise elements in any series of samples are Gaussian-distributed, then only the energy levels of frequency elements associated with spectral signatures will build up on the display. Since the distribution is not Gaussian, the noise energy levels also build up. Even over a short period of time, the display becomes saturated making the spectral signatures of submarines or the like virtually impossible to detect.

SUMMARY OF THE INVENTION

Accordingly, it is a general purpose of the present invention to provide an improved signal processing apparatus which receives spectrum analyses of samples of sonic information and which suppresses frequency components of background noise and enhances the detection of spectral signature components.

This is accomplished according to the present invention by grouping the frequency elements of each analysis into ensembles of equal numbers of frequency elements and computing the average energy level of the elements in each ensemble. Each ensemble average of one sample is negatively combined with respective elements in each corresponding ensemble of the next consecutive analysis and their algebraic sums are accumulated. Displays are provided for both the instantaneous (real-time) and cumulative (integrated) summations, each of which indicates signals of enhanced spectral signatures with significantly suppressed background noise.

It is postulated that this occurs because there is substantial Gaussian distribution of the noise energy levels about each ensemble average and because there is a high stationary probability of noise patterns in each ensemble of consecutive analyses. These two postulations result in energy level buildup of non-Gaussian-distributed frequency elements present in spectral signatures and in substantially no buildup of noise elements in random processes of nature.

BRIEF DESCRIPTION OF THE DRAWING

FIG. 4b is a graph of a portion of a spectral analysis of the next consecutive sample to the sample of FIG. 3 and within the same frequency range of FIG. 4a;

DESCRIPTION OF THE PREFERRED EMBODIMENT

A better appreciation of the present invention may be obtained from a brief discussion of the principles postulated as underlying the fundamental inventive concepts of the invention disclosed herein. As noted above, conventional automatic line integrators produce an energy level buildup during integration of spectrum analyses of both the spectral signature and noise frequency elements. In some instances, very weak signatures may even become lost. This is because the analog output signal from the analyzer is biased to a single bipolar reference level set at approximately the spectrum average which is the average energy level of all the frequency elements in the entire spectrum. The energy level distribution of each element of noise and other natural phenomena about the spectrum average is non-Gaussian; so that algebraically summing the energy level of respective frequency elements of noise about the spectrum average will result in more energy level differentials of one polarity than the other. These will accumulate just as non-Gaussian distributed energy levels of frequency elements associated with spectral signatures.

Various techniques have been employed to prevent such noise saturation. One is by manually raising the bipolar reference level to some arbitrary value which minimizes noise accumulation at the expense of a tolerable loss of weak sonic signatures. Another is by linearly erasing at a fixed rate for a selected number of analyses; but this will erase spectral signatures as well as background noise. In either case, weak and sometimes moderate spectral signatures go undetected.

Experimental results seem to indicate that the noise pattern within an ensemble of a limited number of frequency elements of an analysis of sound detected underwater may be characterized as approaching an ergotic, stationary, random process. It is random because the energy level of each element as a function of time cannot be predicted; it is stationary because corresponding ensemble averages of two consecutive analyses are substantially the same; and it is ergotic because the ensemble average can be made to approach the mean time average of a single element of the ensemble. A more detailed discussion of these phenomena is presented in "Modulation, Noise, and Spectral Analysis" by Philip F. Panter McGraw-Hill, New York, 1965. Characterized in this manner, it can now be assumed that noise energy levels of an ensemble of one analysis will be Gaussian-distributed about the ensemble average of a next adjacent-in-time analysis, and since spectral signatures are not random they will be non-Gaussian distributed about the same ensemble average. Thus, the cumulative noise deviation of the individual frequency elements from the ensemble average of each previous analysis will remain stable over a long period of time while spectral signature frequency elements will build up.

Figure 1:
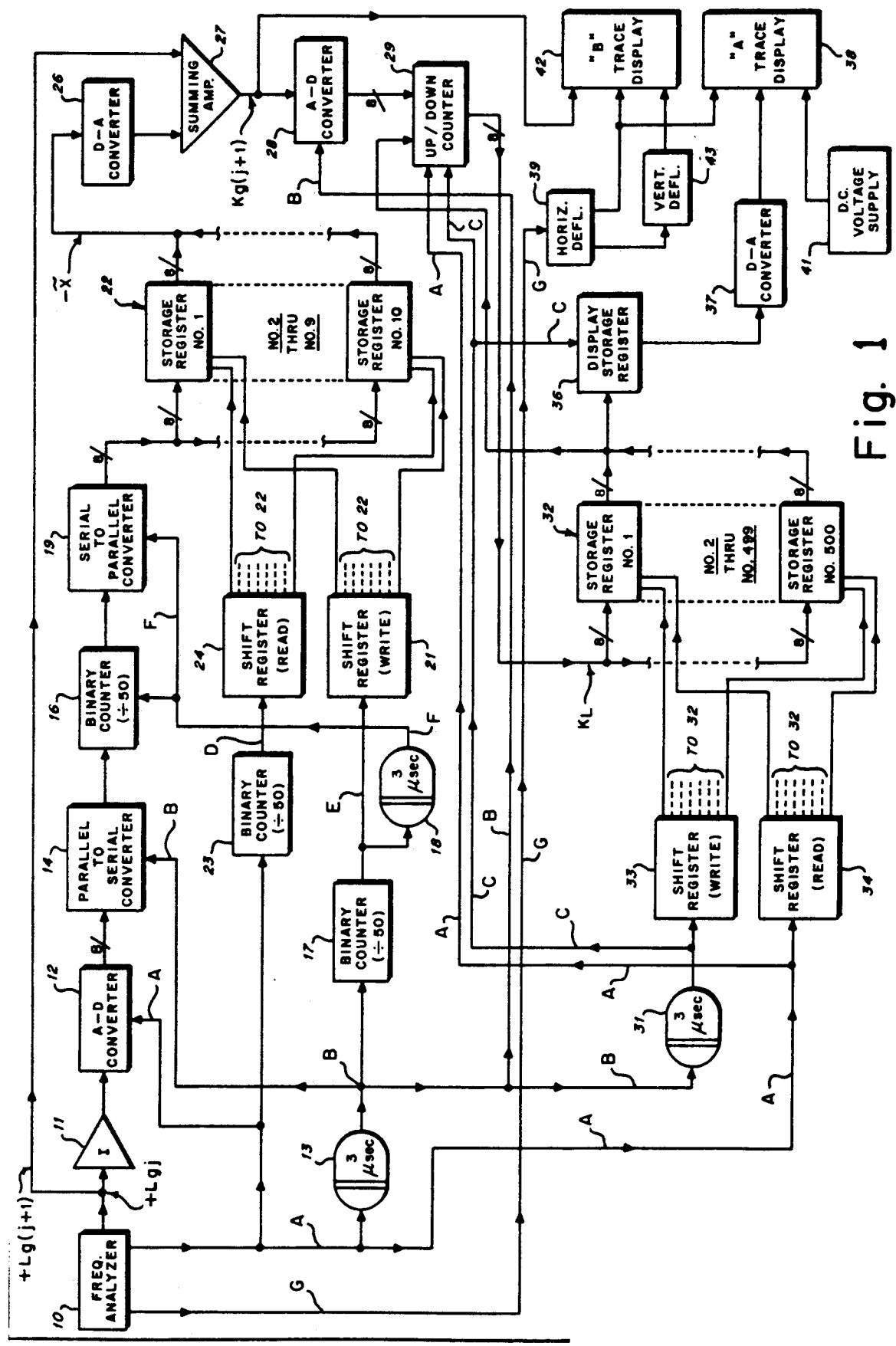
FIG. 1 is a block diagram of a stationary probability integrator system according to the present invention.
Figure 2:
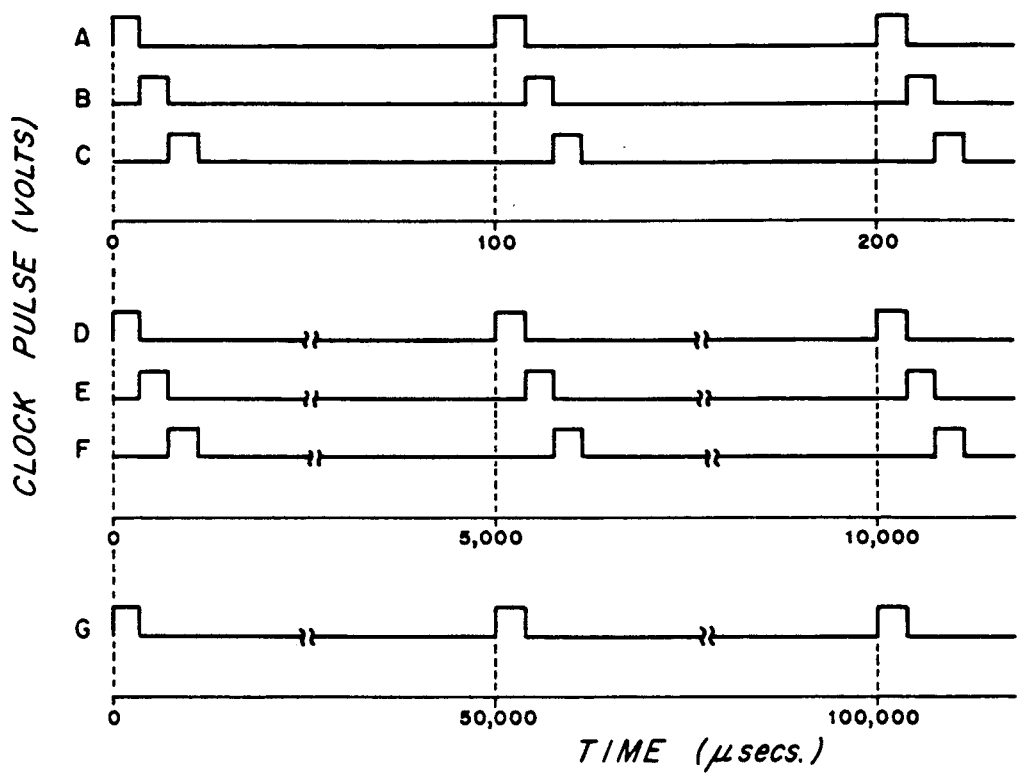
FIG. 2 is a typical timing diagram of clock pulses as applied in the system of FIG. 1.
Figure 3:
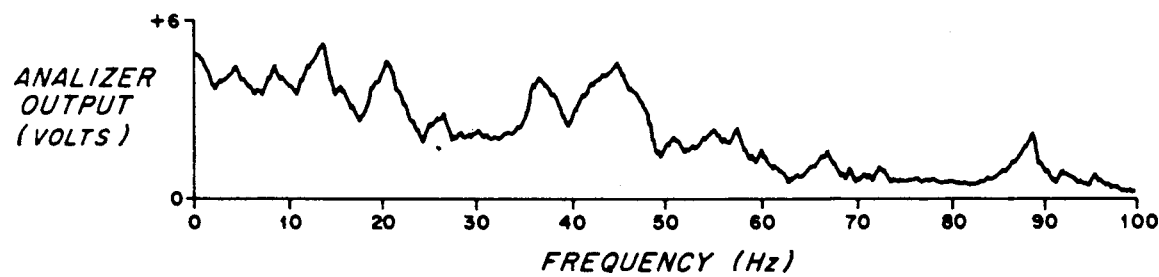
FIG. 3 is a graph of a spectral analysis of an underwater sound sample as applied to the system of FIG. 1.

Referring now to FIG. 1 of the drawing a block diagram of one embodiment of the invention is illustrated for processing and displaying spectrum analyses of detected sonar samples. A conventional frequency analyzer 10 periodically analyzes consecutive samples throughout a predetermined range of frequencies, and produces an analog output signal indicative of the energy level in discrete frequency elements throughout the frequency range. In the illustrated embodiment, a sample is analyzed every 50 milliseconds over a spectral range of 0 to 100 Hz with a frequency resolution of 0.2 Hz per element. Consequently, there are 500 elements per analysis, and the energy level of each element is represented by a 100 μsecond pulse in the analog output signal. The analyzer 10 provides a clock pulse G, as shown in FIG. 2, every 50 milliseconds at the start of each analysis, and a clock pulse A every 100 μseconds at the start of each frequency element. FIG. 3 is a graphic representation of a single analysis at the output of the analyzer 10. As can be seen from an enlargement in FIG. 4a, it is an analog signal of voltage which varies in steps with time, the voltage amplitude being proportional to the energy level and each step represents a frequency element. The energy level at a particular point in time is designated as $L_{gj}$, where g is the frequency element (0 to 500) of any sample analysis, and j is the sample analysis number.

The polarity of spectrum analyzer output signal is reversed from positive to negative in an inverter 11 and then fed to the input of an A-D (analog-to-digital) converter 12. Clock pulse A, applied to the converter 12, triggers conversion of the signal $-L_{gj}$ in each frequency element into an eight-bit binary coded digital word in parallel format. A clock pulse B, delayed approximately 3 microseconds after pulse A by a time delay 13, is applied to a parallel-to-serial converter 14 causing the latter to convert the word from parallel format to a train of pulses or serial format, the number of pulses in each 100 microsecond element being proportional to the energy level. The delay times herein disclosed are merely exemplary and may be varied according to computer timing requirements.

The serial pulses from converter 14 are fed to a binary counter 16 which produces one output pulse for every 50 input pulses having the effect of dividing the energy level input by a constant of 50. Another binary counter 17 produces a clock pulse E for every 50 of delayed clock pulses B, or one pulse every 5 milliseconds. Pulse F is delayed approximately 3 μseconds after pulse E by a time delay 18 and is applied to the binary counter 16 after every fiftieth element to clear any remainder. This establishes an ensemble average for each 50 elements of the analysis because the number of pulses in each 5 millisecond period is proportional to the average energy level of the 50 frequency elements in each ensemble. The ensemble average X may be mathematically expressed as follows:

$$X_j = \sum_{g=1}^{g=50} - L_{\frac{gj}{50}}. \qquad (1)$$

Clock pulse F also operates a serial-to-parallel converter 19 to convert each ensemble average to an eight-bit binary coded digital word.

Clock pulse E, occurring every 5 milliseconds before clock pulse F, operates a shift register 21 which sequentially strobes ten storage registers 22 (only two illustrated in FIG. 1) to accept or "write" each of the ten ensemble averages in each analysis into respective registers. Clock pulse D, developed at the output of a binary counter 23 once every 50 milliseconds and 3 μsecs. before clock pulse E, operates a shift register 24 which sequentially strobes the ten storage registers 22 to "read out" the ensemble averages in the same order but at the beginning of the next consecutive analysis. A D-A (digital-to-analog) converter 26 converts each eight-bit word into corresponding analog format. The analog signal of the ensemble averages at the output of converter 26, now lagging its corresponding analysis from the analyzer 10 by 50 milliseconds, is combined with the next consecutive frequency spectrum analysis $+L_{g(j+1)}$ analyzer 10 in a summing amplifier 27, the output $K_{g(j-1)}$ thereof representing the algebraic sum of the inputs and mathematically expressed as follows:

$$K_{g(j+1)} = L_{g(j+1)} - X_j. \quad (2)$$

An A-D converter 28, operated by clock pulse B, receives the analog signal from amplifier 27 and converts it to an eight-bit binary coded digital word indicative of the difference in energy level of each frequency element of the next consecutive analysis and the preceding ensemble average in which the element appears. An up/down counter 29, upon receipt of clock pulse A, accepts the binary output from converter 28 and adds or subtracts the value, depending on its sign, to the value previously registered in the counter 29. A clock pulse C, from time delay 31 and approximately 3 microseconds after clock pulse B and 6 microseconds after the "write in" clock pulse A at counter 29, updates and integrates the algebraic sum which then appears in an eight-bit binary format at the inputs of 500 storage registers 32, each register being capable of accommodating the integrated energy level $K_L$ of one frequency element of n number of analyses which may be mathematically expressed as follows:

$$K_L = \sum_{j=1}^{j=n} K_{g(j+1)}. \quad (3)$$

The clock pulse C, which clears the up/down counter 29 of every 100 microseconds element, also operates a shift register 33 having 500 outputs of sequential pulses 100 μsecs. apart respectively connected to the storage registers 32 for strobing in the energy level of all of the frequency elements of the entire spectrum analysis in respective registers. A shift register 34, operated by clock pulse A and having 500 outputs of sequential pulses 100 microseconds apart respectively connected to the storage registers 32, sequentially strobe out the 500 levels in eight-bit binary-coded digital words. The outputs of registers 32 are fed back to the other input of the up/down counter 29 and also to a display storage register 36. The clock pulse C, occurring at each 100 microsecond element, "writes in" the words at the storage register 36 for each element and serially produces an eight-bit binary-coded word in parallel format which is converted to an analog signal in a D-A converter 37. The analog output of the converter 37 drives the vertical deflection coils of an "A" trace CRT display 38. Horizontal deflection of the display 38 is obtained from a horizontal deflection circuit 39 which is synchronized by clock pulse G from the frequency analyzer 10 at the start of each analysis. A constant d.c. voltage supply 41 provides a constant video input signal of the display 38. The combined inputs thereby provide an amplitude versus frequency trace, integrated over time, of the spectrum analysis with enhanced spectral signatures and with noise suppressed.

A "B" trace, or lofargram, of each analysis in real time with suppressed noise is also provided on a CRT display 42. The output of summing amplifier 27 drives the video input of the display 42 to vary the intensity as a junction of the difference in energy levels. The output horizontal deflection circuit 39 drives the horizontal deflection at 50-millisecond intervals, and a vertical deflection circuit 43, receiving a synchronizing pulse from the horizontal deflection circuit 39 progressively steps the vertical deflection signal on the display, each step corresponding to one horizontal sweep. Thereby display 42 provides a display of each frequency spectrum analysis with noise suppressed according to the invention.

Figure 4C:
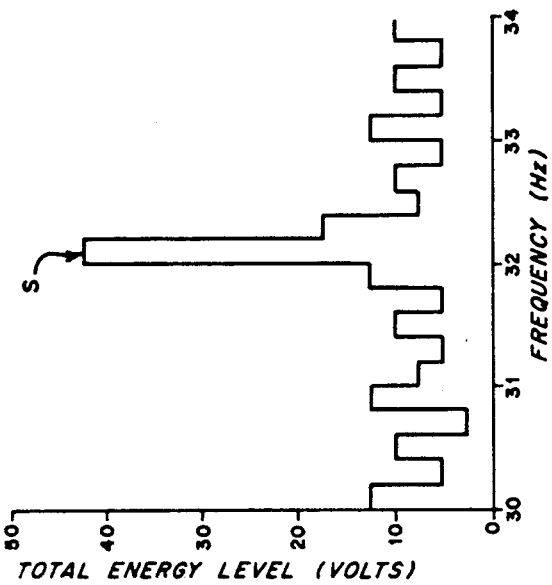
FIG. 4c is a graph of a portion of a spectral analysis of a series of samples integrated according to the invention over a discrete time period.
Figure 4B:
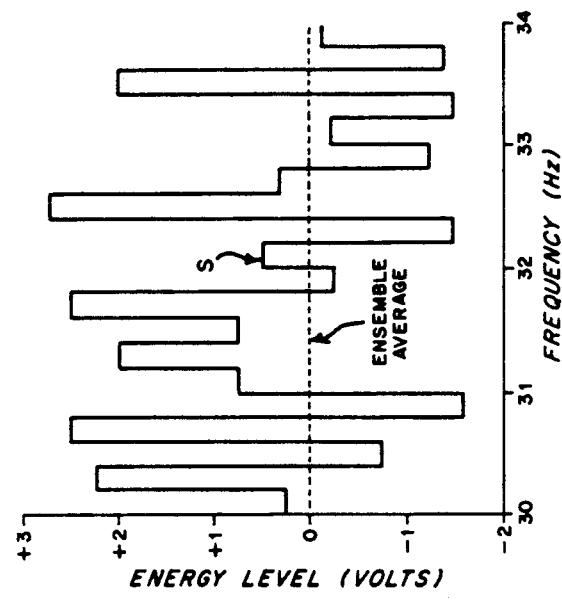
Figure 4A:
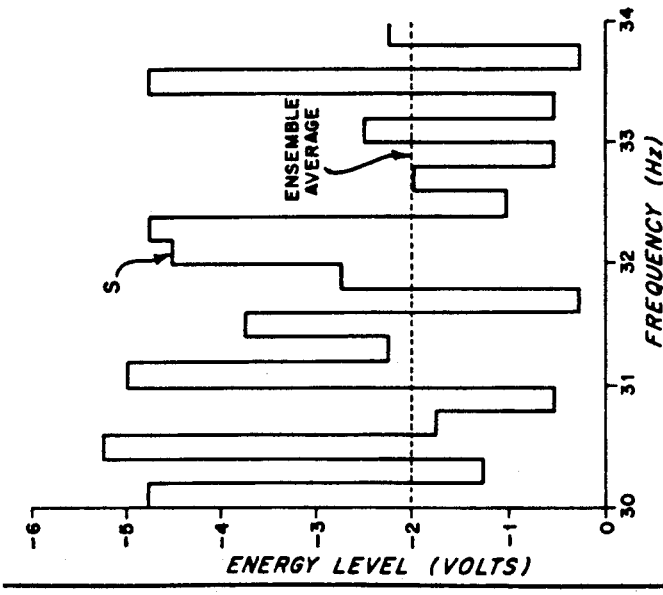
FIG. 4a is an enlarged, more detailed view of a portion of the graph of FIG. 3.
Figure 5:
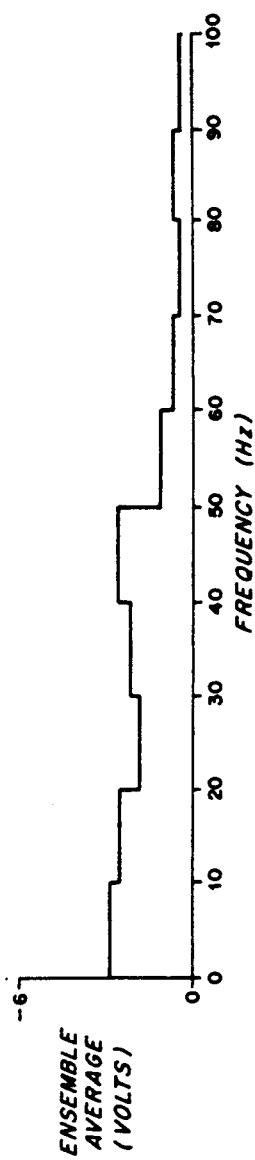
FIG. 5 represents ensemble averages of the spectral analysis for the sample of FIG. 3.

Operation of the stationary probability integrator system will now be summarized with reference to two consecutive samples of sound over a frequency spectrum of 0 to 100 Hz. FIG. 3 represents the energy levels of the frequencies of the first analysis. The analysis between 30.0 and 34.0 Hz, having a resolution of 0.2 cycles per increment or element, is as shown in FIG. 4a, except in positive polarity. For purposes of this example, a frequency element S of 32.0 Hz is designated as the only non-Gaussian spectral signature in a Gaussian-distributed noise pattern. The first analysis is inverted by inverter 11 resulting in a frequency versus energy level signal as illustrated in FIG. 4a. Each frequency element is sequentially converted into an eight-bit binary word and then converted to a series of pulses by converter 14. The total number of pulses occurring within each ensemble of 50 elements is integrated and divided by 50 resulting in ten consecutive ensemble averages and is shown as a dotted line in FIG. 4a. All ten ensemble averages, as shown in FIG. 5, are consecutively fed through storage registers 22 and D-A converter 26 to one input of the summing amplifier 27.

Binary counter 23 and shift register 24 cause the ensemble averages of first analysis to coincide in time with the analog output of the second analysis from analyzer so that when they are negatively combined in summing amplifier 27, the output is a bipolar representation of the second analysis referenced about respective ensemble averages of the first analysis. FIG. 4b illustrates this output from the summing amplifier 27, the spectral signature S still appearing positive at 32.0 Hz.

Figure 6:
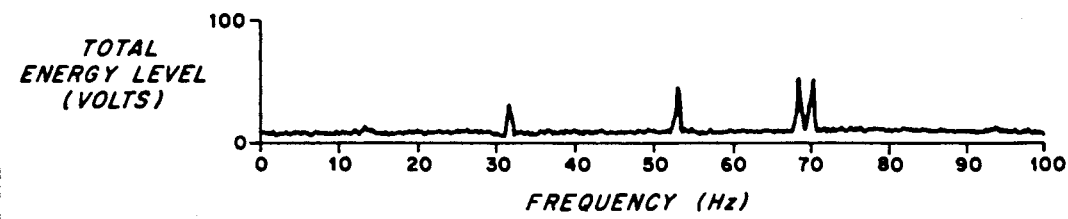
FIG. 6 is a graph of spectral analyses of samples processed according to the invention and integrated over a discrete period of time.

The deviations of each element of the second analysis from the corresponding ensemble average of the first analysis is converted into digital format and the deviation is continuously integrated with its preceding total in the up/down counter 29. Through storage registers 32 and 36, and D-A converter 37, these totals are processed for indication on the "A" trace display 38. FIG. 4c illustrates the display, when taken over n number of frequency spectrum analyses. Since any noise is Gaussian-distributed, the sum of their deviations about the ensemble average will be extremely low relative to the total energy accumulated for the non-Gaussian-distributed spectral signature S. FIG. 6 is a representation on the "B" trace display 38 of the integrated spectrum analyses over the complete 0 to 100 Hz. range.

Some of the many advantages of the present invention should now be apparent. For example, premised on the noise patterns of groups of frequency elements being ergotic stationary random processes for underwater sound, the noise can be effectively suppressed while spectral signatures enhanced. The above-described stationary probability integrator system is ideally suited for the detection of spectral signatures of submarines and other artifacts not found in nature which have non-Gaussian distribution of energy levels. The integrator system utilizes conventional components throughout and is readily adaptable to existing frequency analyzers and automatic line integration systems, and is capable of indicating spectral signatures in both real time and integrated time formats.

Of course, it will be understood that various changes in the details, materials, steps and arrangement of parts, which have been herein described and illustrated in order to explain the nature of the invention, may be made by those skilled in the art within the principal scope of the invention as expressed in the appended claims.

What is claimed is:

1. A system for suppressing noise in a spectrum analysis within a predetermined frequency range of a complex waveform sample, the analysis being an analog signal of predetermined duration composed of a plurality of discrete magnitudes in equal increments of time indicative of the energy levels of a corresponding plurality of frequency elements of predetermined bandwidths and of progressively increasing frequency, comprising, in combination:

timing means providing pulses at time intervals synchronous with equal multiples of said time increments;

averaging means receiving one of said analog signals and said timing means pulses and providing a signal of said predetermined duration composed of a plurality of discrete magnitudes in said time intervals indicative of the average energy levels of a corresponding plurality of ensembles of the frequency elements of progressively increasing frequency; and combining means concomittantly receiving the averaging means signal for said one analog signal and the next-consecutive analog signal and providing a signal indicative of the difference in energy levels.

2. A system according to claim 1 further comprising: integrating means receiving a consecutive series of said combining means signals and providing a signal indicative of the cumulative energy level of each frequency element of the series.

3. A system according to claim 2 further comprising:
   first circuit means providing a constant signal;
   second circuit means providing a ramp-like signal synchronous with the integrating means signal; and
   display means receiving said first circuit means signal for constant image intensity, said second circuit means signal for horizontal image deflection, and said integrating means signal for vertical image deflection;
   whereby an "A" trace of the integrated suppressed-noise spectrum analyses series is visually presented.

4. A system according to claim 1 further comprising:
   first circuit means providing a ramp-like signal synchronous with the combining means signal;
   second circuit means providing a step-like signal synchronous with the combining means signal; and
   display means receiving said first circuit means signal for horizontal image deflection, said second circuit means signal for vertical deflection, and said combining means signal for image intensity;
   whereby a "B" trace of each suppressed-noise spectrum analysis is visually presented.

5. A system according to claim 1 wherein said averaging means comprises:
   first converter means receiving said one analog signal and providing a train of pulses in each of said time increments proportional to the energy level of the corresponding frequency element;
   binary counter means receiving said first converter means pulses and said timing means pulses and providing a train of pulses proportional to the average energy level of said frequency element ensembles;
   second converter means receiving said binary counter pulses and providing an analog signal composed of discrete amplitudes indicative of the average energy levels of said ensembles.

6. A system according to claim 2 wherein said integrating means comprises:
   first converter means receiving said combining means signal and providing a parallel binary-coded signal indicative thereof;
   up/down counter means receiving two parallel binary-coded signals, one of said signals being the first converter means signal and the other being the up/down counter means signal, and providing a parallel binary-coded signal indicative of the sum of the inputs; and
   second converter means receiving the up/down counter means output and providing an analog signal of said fixed duration indicative of the total energy level of a series of spectrum analyses.

7. A stationary probability integrator system for suppressing noise in a spectrum analysis within a predetermined frequency range of a complex waveform sample, the analysis being an analog signal of predetermined duration composed of a plurality of discrete magnitudes in equal increments of time indicative of the energy levels of a corresponding plurality of frequency elements of predetermined bandwidths and of progressively increasing frequency, comprising, in combination:

timing means providing pulses at time intervals synchronous with equal multiples of said time increments;

first converter means receiving one of said analog signals and providing a train of pulses in each of said time increments proportional to the energy level of the corresponding frequency element;

binary counter means receiving said first converter means pulses and said timing means pulses and providing a train of pulses proportional to the average energy levels of a corresponding plurality of ensembles of the frequency elements of progressively increasing frequency;

second converter means receiving said binary counter pulses and providing an analog signal composed of discrete amplitudes indicative of the average energy levels of said ensembles;

combining means concommitantly receiving the averaging means signal for said one analog signal and the next-consecutive analog signal and providing a signal indicative of the difference in energy levels;

third converter means receiving said combining means signal and providing a parallel binary-coded signal indicative thereof;

up/down counter means receiving two parallel binary-coded signals, one of said signals being the third converter means signal and the other being the up/down counter means signal, and providing a parallel binary-coded signal indicative of the sum of the inputs;

fourth converter means receiving the up/down counter means output and providing an analog signal indicative of the total energy of a series of spectrum analyses;

first display means receiving said integrating means signal and providing an "A" trace image thereof; and second display means receiving said combining means signal and providing a "b" trace image thereof.

* * * * *